March 1, 1960 C. L. PEASE 2,926,930
HITCH AND WHEEL MOUNTING FOR TRAILERS
Filed Sept. 18, 1958 2 Sheets-Sheet 1

Clifford L. Pease
INVENTOR.

BY

March 1, 1960 C. L. PEASE 2,926,930
HITCH AND WHEEL MOUNTING FOR TRAILERS
Filed Sept. 18, 1958 2 Sheets-Sheet 2
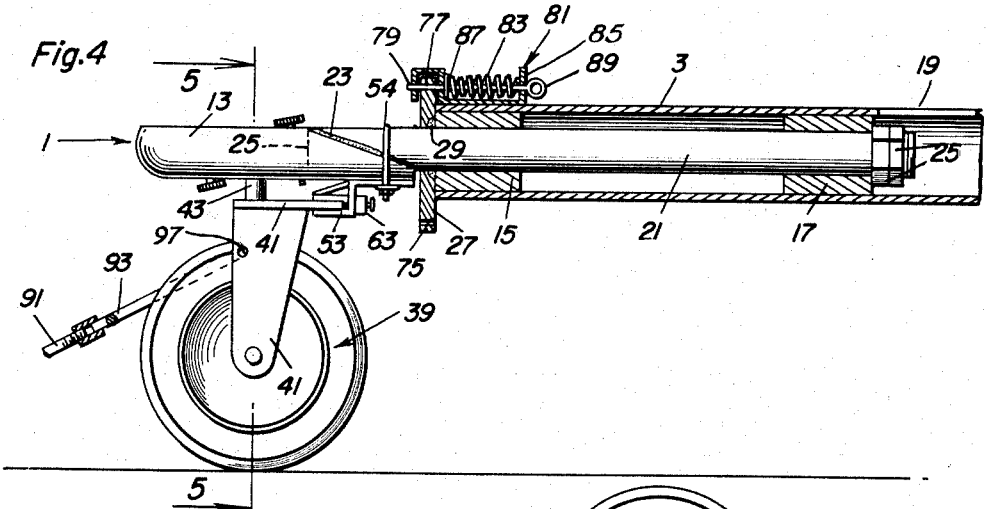
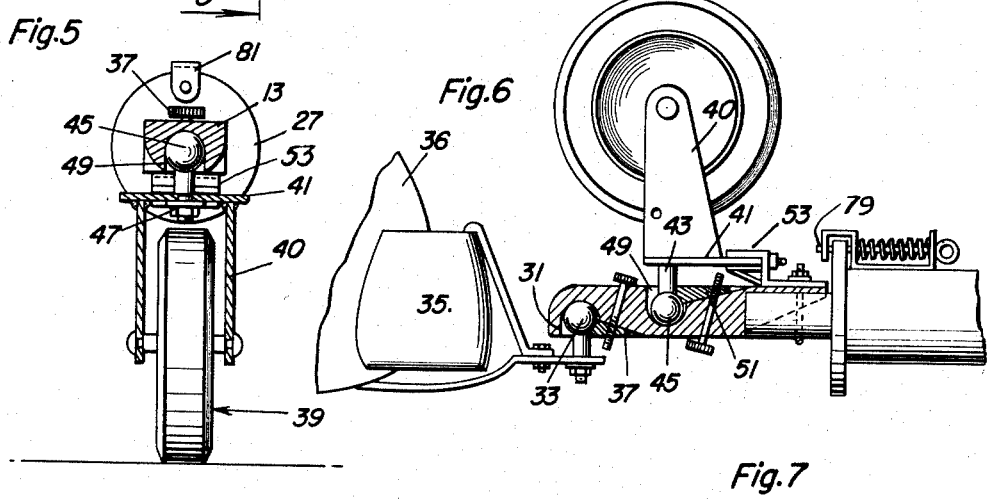
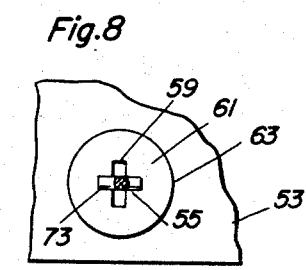
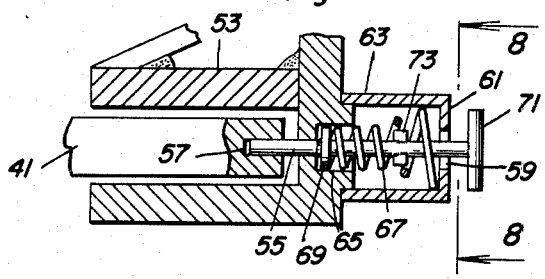
Clifford L. Pease
INVENTOR.

United States Patent Office 2,926,930
Patented Mar. 1, 1960

2,926,930

HITCH AND WHEEL MOUNTING FOR TRAILERS

Clifford L. Pease, Eugene, Oreg.

Application September 18, 1958, Serial No. 761,739

1 Claim. (Cl. 280—475)

This invention relates to improvements in combined hitches and front wheel mountings for trailers.

The primary object of the invention is to provide a hitch for couplings a two-wheeled trailer to a tow vehicle, a steerable front ground wheel on the hitch, and means for attaching the hitch to a tubular tongue of the trailer for rotation to swing the wheel into and from ground engaging position when the trailer is uncoupled and coupled, respectively and whereby the trailer when uncoupled may be pulled or pushed manually on three wheels and steered, and the steerable wheel may be swung into an out-of-the-way idler position when the trailer is coupled.

Another object is to provide a hitch and front wheel mounting according to the foregoing which is attachable, as a unit, to the tongue without materially altering the tongue, and which is inexpensive to manufacture, safe to use, and durable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is an enlarged fragmentary view in vertical longitudinal section, partly in side elevation, of the hitch and wheel mounting with the wheel engaged with the ground;

Figure 5 is a view in vertical transverse sectional taken on the line 5—5 of Figure 4;

Figure 6 is an enlarged fragmentary view, partly in vertical longitudinal section and partly in side elevation, with the hitch coupled to a tow vehicle and the front wheel swung into out-of-the-way idle position;

Figure 7 is an enlarged fragmentary view in vertical section, partly in side elevation, of means for locking the front wheel against steering movement when in idle position, and Figure 8 is an enlarged fragmentary view in vertical cross section taken on the line 8—8 of Figure 7.

Figure 1:
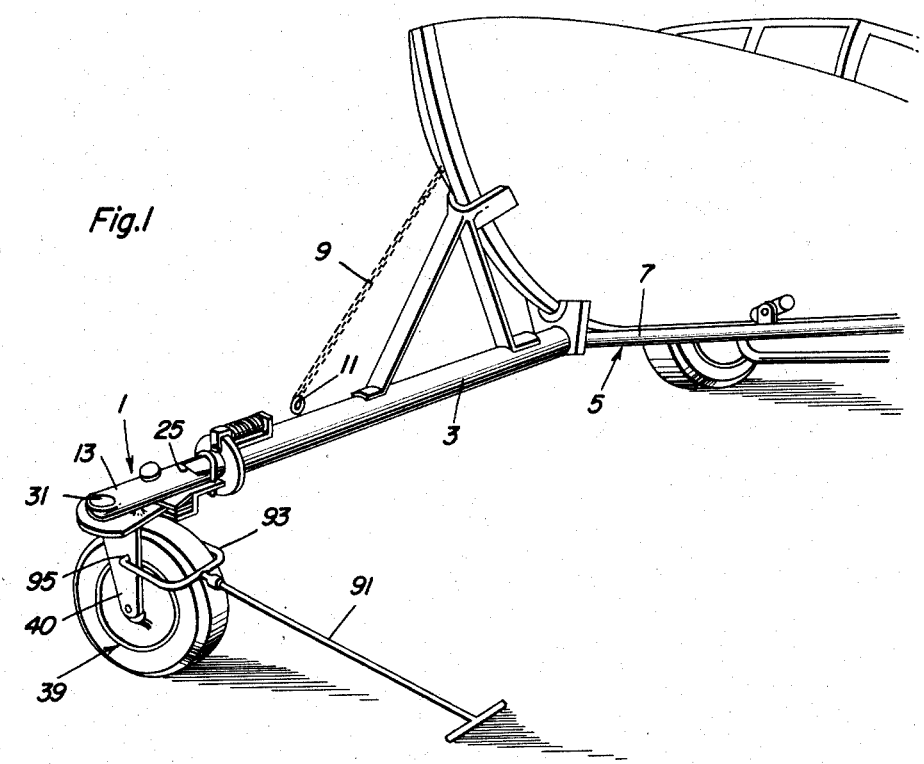
Figure 1 is a fragmentary perspective view of the combined hitch and front wheel mounting attached to the tongue of the two wheeled trailer with the wheel swung into ground engaging position.
Figure 2:
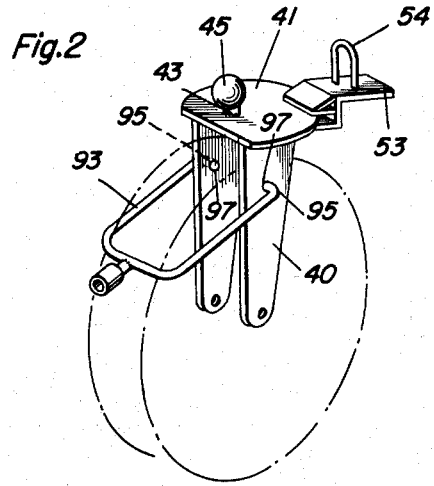
Figure 2 is an enlarged view in perspective, partly in broken lines, of the front wheel mounting, and brace means for the same.
Figure 3:
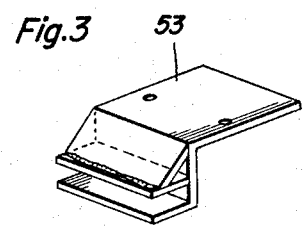
Figure 3 is an enlarged perspective view of a guide bracket forming part of the brace means.

Referring by numerals to the drawings, the combined hitch and wheel mounting, designated generally by the numeral 1, has been shown therein, for illustrative purposes, as attached to a forwardly extending tubular tongue 3 of a two-wheeled boat trailer 5 including a boat rack 7 and a boat holding chain 9 attached at 11 to the tongue 3.

The hitch and wheel mounting 1 comprises an extension hitch bar 13 for the tongue 3. The hitch bar 13 is attached to the tongue to extend longitudinally forwardly therefrom and for manual rotation about its longitudinal axis through an angle of 180°, into a coupling position shown in Figures 5 and 6, or into an inverted position shown in Figures 1 and 4.

Attaching means is provided for the hitch bar 13 comprising the following. A pair of front and rear sleeve bearings 15, 17 are suitably fixed in the tongue 3 in longitudinally spaced relation therein and may be positioned in said tongue 3 through a suitable slot 19 in said tongue. A shaft 21, forming part of the hitch, is journalled in said bearings 15, 17 with a front end seated and welded, as at 23, in a slot 25 in the rear end of the hitch bar 13. Nuts 25 on the rear end of the shaft 21 behind the rear bearing 17, and an annular stop plate 27 welded, as at 29, concentrically on the shaft 21 between the hitch bar 13 and the front end of the tongue 3, holds said shaft 21 and consequently the hitch bar 13 against end play relative to said tongue 3.

A ball hitch socket 31 is provided in one side and adjacent the front end of the hitch bar 13 for receiving, when the hitch bar 13 is in coupling position, the conventional hitch ball 33 on the rear bumper 35 of an automobile 36. The conventional screw feed ball lock 37 is provided in the hitch bar 13 in the rear of the socket 31, for securing the hitch ball 33 in said socket 31.

A caster wheel 39 is detachably attached to the hitch bar 13 to extend from the side thereof opposite the side having the ball hitch socket 31 therein, and in the rear of the ball lock 37, to project upwardly above said hitch bar 13 when the latter is in coupling position, and to be swung lateraly beneath said hitch bar into ground engaging position when the hitch bar 13 is inverted with the socket 31 inverted and the hitch bar 13 consequently in coupling position.

The caster wheel 39 is attached to the hitch bar 13 for turning for steering movement about an axis perpendicular to said hitch bar 13, and by the following means. The fork 40 of the caster wheel 39 is provided with a segmental crown plate 41 concentric to said axis of steering movement and extending rearwardly from said fork 41. A shouldered king pin 43 perpendicular to the plate 41 with a head ball 45 is attached to said plate 43 in the axis thereof by a nut, as at 47. A socket 49 is formed in the hitch bar 13 in the rear of the ball lock 37 and in which the head ball 45 is rotatably received and secured by another conventional screw-feed ball lock 51 in said hitch bar 13.

Brace means is provided for preventing the caster wheel 39 from tilting laterally out of its axis of steering movement comprising a channeled guide bracket 53 in the rear of the crown plate 41 straddling said plate 41 and secured to the shaft 21 and to the hitch bar 12 by a U-bolt 54.

A slidable latch bolt 55 is provided in the bracket 53 at the rear of and coplanar with the crown plate 41 for projection into and retraction out of a notch in said plate 41 to lock the caster wheel against rotation about its axis of steering movement and to unlock said wheel for steering movement about said axis. The latch bolt 55 is rotatably and slidably extended through a vertical slot 59 in the rear wall 61 of a spring housing 63 on the bracket 53 and through a stepped bore 65 in said bracket. A helical spring 67 in the housing 63 bearing against said wall 61 and a fixed collar 69 on said bolt 55 projects said bolt. A cross-handle 71 on said bolt 55 provides for manually retracting said bolt.

A holding cross pin 73 on the latch bolt 55 is movable out of the housing 63 through the slot 59 when said bolt 55 is retracted and is rotatable crosswise of said slot 59 by rotation of said bolt 55 and whereby to engage said rear wall 61 and hold said bolt retracted, and said pin is rotatable by said bolt 55 to pass through said slot 59 to release said bolt 55 for projection by the spring 67.

Means for releasably locking the hitch bar 13 against rotation in either its coupling or inverted positions is provided comprising the following. A pair of diametrically opposite transverse notches 75, 77 are provided in the plate 27 for receiving a latch bolt 79 which projects into said notches 75, 77 respectively, in said coupling and inverted positions of the hitch bar 13. The latch bolt 79 is slidably mounted for projection and retraction into and out of said notches 75, 77, in a bracket 81 fixed on top of the tongue 3. A helical spring 83 on the latch bolt 79 bears against one end 85 of said bracket 81 and a collar 87 on said bolt 79 to project said bolt. A hand-grip 89 on the latch bolt 79 is provided for retracting the latch bolt to unlock said hitch bar 13 for rotation thereof.

A handle 91 is provided for pulling the trailer 5 when uncoupled. The handle 91 is provided with a resilient rear end fork 93 adapted to straddle the caster wheel 40 and which is provided with lateral inturned terminal trunnions 95 adapted to snap into sockets 97 on opposite sides of said fork 40 and to be pulled out of said socket to attach and detach said handle respectively to said caster wheel.

The operation of the invention will be readily understood. When the hitch bar 13 is rotated into coupling position, shown in Figure 6, the socket 31 is lowermost for coupling to the ball hitch or hitch ball, 33 and the caster wheel 39 is swung laterally out of ground engaging position into an upright idle position above said hitch bar 13, and the latch bolt 79 is snapped by the spring 83 into the notch 75 to lock said hitch bar 13 against rotation. By retracting the latch bolt 79, the hitch bar 13 may be rotated into inverted position, shown in Figures 1 and 4, to rotate the socket 31 uppermost and to swing the caster wheel 39 into ground engaging position, in which position of said wheel, the latch bolt 79 is snapped by the spring 83 into the notch 77, as best shown in Figure 4, to lock said hitch bar 13 in inverted position and the caster wheel 39 in ground engaging position. To permit steering movement of the caster wheel 39 in its ground engaging position, it is unlocked by retraction of the latch bolt 55, and when said wheel 39 is swung into idle position in response to rotation of the hitch bar 13 into inverted position, the latch bolt 55 is operated to release the same for projection into the notch 57 to lock said wheel 39 against rotation about its axis of steering movement.

When the caster wheel 39 is in ground engaging position, the handle 91 may be attached for pulling or pushing of the trailer 5 on three wheels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a two wheeled trailer having a tubular tongue, an extension hitch bar for said tongue for coupling the trailer to a tow vehicle, means on said hitch bar journaled in said tongue for attaching the hitch bar to said tongue for rotation about its longitudinal axis into coupling and inverted positions in front of said tongue, a caster wheel on one side of said hitch bar, means mounting said caster wheel on said hitch bar for steering movement about an axis perpendicular to said hitch bar and for lateral swinging into and from ground engaging position in response to rotation of said hitch bar into inverted and coupling positions respectively, coengaging devices on said journaled means and said tongue for locking said hitch bar against rotation in its coupling and inverted positions, and means on said caster wheel and said journaled means coacting to prevent lateral movement of said caster wheel relative to said hitch bar and steering movement of said caster wheel when said hitch bar is inverted, said means on said caster wheel and said journal means comprising a notched segmental crown plate on the caster wheel, a channel member on said journaled means straddling said crown plate, and a lock bolt in said channel member engageable with the notch in said crown plate.

References Cited in the file of this patent

UNITED STATES PATENTS

| | | |
|---|---|---|
| 454,257 | Crean et al. | June 16, 1891 |
| 1,076,555 | Dillon | Oct. 21, 1913 |
| 1,633,638 | Jarvis | June 28, 1927 |
| 1,649,527 | Herold | Nov. 15, 1927 |
| 2,608,416 | Frost | Aug. 26, 1952 |
| 2,692,149 | Wilcox | Oct. 19, 1954 |

FOREIGN PATENTS

| | | |
|---|---|---|
| 883,838 | Germany | July 20, 1953 |